US012522200B2

(12) United States Patent
Tuller et al.

(10) Patent No.: US 12,522,200 B2
(45) Date of Patent: Jan. 13, 2026

(54) SYSTEM AND METHOD USING FRICTION CLUTCH ON ELECTRIFIED VEHICLE FOR ENHANCED SHIFT FEEL

(71) Applicant: FCA US LLC, Auburn Hills, MI (US)

(72) Inventors: Zachary L Tuller, Grand Rapids, MI (US); Nadirsh Patel, Farmington Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 156 days.

(21) Appl. No.: 18/581,507

(22) Filed: Feb. 20, 2024

(65) Prior Publication Data

US 2025/0263066 A1   Aug. 21, 2025

(51) Int. Cl.
*B60W 20/30* (2016.01)
*B60W 10/02* (2006.01)
*B60W 10/08* (2006.01)

(52) U.S. Cl.
CPC .......... *B60W 20/30* (2013.01); *B60W 10/02* (2013.01); *B60W 10/08* (2013.01); *B60W 2710/025* (2013.01); *B60W 2710/083* (2013.01)

(58) Field of Classification Search
CPC ...... B60W 20/30; B60W 10/02; B60W 10/08; B60W 2710/025; B60W 2710/083
USPC .......................................................... 701/22
See application file for complete search history.

(56) References Cited

U.S. PATENT DOCUMENTS

| | | | | |
|---|---|---|---|---|
| 6,835,164 | B2 * | 12/2004 | Habeck | F16H 61/061 477/149 |
| 11,524,585 | B2 * | 12/2022 | Oh | B60K 6/48 |
| 11,654,779 | B2 * | 5/2023 | Isami | F16H 61/0213 477/8 |
| 11,993,250 | B2 * | 5/2024 | Imamura | B60L 50/60 |
| 11,999,243 | B2 * | 6/2024 | Isami | B60K 35/213 |
| 2013/0035817 | A1 * | 2/2013 | Bahar | B60K 7/0007 701/22 |
| 2018/0297465 | A1 * | 10/2018 | Miyaishi | B60K 35/214 |
| 2020/0131955 | A1 * | 4/2020 | Okuda | F01M 1/16 |
| 2021/0387529 | A1 * | 12/2021 | Oh | B60W 30/19 |
| 2021/0387530 | A1 * | 12/2021 | Oh | F16H 61/0213 |

(Continued)

FOREIGN PATENT DOCUMENTS

CN    107117157 A  *  9/2017  ............ B60W 10/08

OTHER PUBLICATIONS

English Translation of CN-107117157-A, accessed via Espacenet, Sep. 3, 2025. (Year: 2025).*

*Primary Examiner* — Krishnan Ramesh
(74) *Attorney, Agent, or Firm* — Jeremy J. Klobucar

(57) ABSTRACT

An electrified powertrain and method that generates and transfers drive torque to a driveline of an electrified vehicle is provided. The electrified powertrain includes an electric drive module (EDM) and a controller. The EDM includes an electric motor having an output, a transmission that is driven by the output of the electric motor, and a clutch that moves between (i) a closed position; (ii) an open position; and (iii) a plurality of slip positions between the closed and open positions. The controller controls the clutch based on operating conditions. The controller: commands a steady state clutch operation and electric motor torque based on a position of an accelerator pedal; determines whether an output torque of the electric motor is at a limit; and commands a simulated shift that modifies a position of the clutch based on a determination that the electric motor is at the limit.

13 Claims, 7 Drawing Sheets

(56) References Cited

U.S. PATENT DOCUMENTS

| | | | |
|---|---|---|---|
| 2021/0387531 A1* | 12/2021 | Oh | B60W 30/19 |
| 2022/0041070 A1* | 2/2022 | Isami | B60K 35/60 |
| 2022/0041157 A1* | 2/2022 | Imamura | B60W 10/06 |
| 2023/0039347 A1* | 2/2023 | Isami | B60L 3/0061 |
| 2025/0196656 A1* | 6/2025 | Oh | B60L 15/20 |

* cited by examiner

SYSTEM AND METHOD USING FRICTION CLUTCH ON ELECTRIFIED VEHICLE FOR ENHANCED SHIFT FEEL

FIELD

The present application generally relates to electrified vehicles and, more particularly, to a control system and method for simulating the feel of a traditional shifting event on an electrified vehicle.

BACKGROUND

An electrified vehicle (hybrid electric, plug-in hybrid electric, range-extended electric, battery electric, etc.) includes at least one battery system and at least one electronic drive module having an electric motor and associated electric drive gearbox assembly. Typically, the electrified vehicle would include a high voltage battery system and a low voltage (e.g., 12 volt) battery system. In such a configuration, the high voltage battery system is utilized to power at least one electric motor configured on the vehicle and to recharge the low voltage battery system via a direct current to direct current (DC-DC) convertor. Electrified vehicles typically do not need the same number of gears as in a conventional internal combustion engine (ICE). In this regard, electric motors do not have the same number of gears in their transmissions to accelerate and/or operate efficiently compared to a conventional ICE. However, in some instances, users of electrified vehicles still want to feel the traditional shift disturbance in vehicle acceleration experienced with traditional ICE vehicles. Accordingly, while such electrified vehicles do work well for their intended purpose, there is a desire for improvement in the relevant art.

SUMMARY

According to one example aspect of the invention, an electrified powertrain that generates and transfers drive torque to a driveline of an electrified vehicle is provided. The electrified powertrain includes an electric drive module (EDM) and a controller. The EDM includes an electric motor having an output, a transmission that is driven by the output of the electric motor, and a clutch that moves between (i) a closed position that transfers torque from the transmission to the driveline; (ii) an open position that decouples torque from the transmission to the driveline; and (iii) a plurality of slip positions between the closed and open positions that partially transfer torque from the transmission to the driveline. The controller controls operation of the clutch based on operating conditions including a position of an accelerator pedal. The controller: commands a steady state clutch operation and electric motor torque based on a position of the accelerator pedal; determines whether an output torque of the electric motor is at a limit; and commands a simulated shift that modifies a position of the clutch based on a determination that the electric motor is at the limit.

In some implementations, the controller is further configured to command a simulated shift that modifies the electric motor torque based on a determination that the electric motor is not at the limit.

In some implementations, the controller is further configured to determine whether the simulated shift is complete; and command steady state clutch operation based on a determination that the simulated shift is complete.

In some implementations, commanding a simulated shift that modifies a position of the clutch comprises: commanding the clutch to move to a slip position between the open and closed positions for a predetermined time; and commanding the clutch to move to the closed position.

In some implementations, commanding the clutch to move to the slip position comprises dropping a clutch torque below a holding torque thereby splitting motor torque between propelling the electrified vehicle and accelerating the electric motor.

In additional aspects, the controller is further configured to command the clutch torque to a larger value than the holding torque of the clutch. While the clutch is slipping this results in additional propulsion for the vehicle beyond the torque from the motor.

In additional features, the electrified powertrain further includes an internal combustion engine (ICE) that selectively drives the driveline.

According to one example aspect of the invention, a method for controlling an electrified powertrain that generates and transfers drive torque to a driveline of an electrified vehicle is provided. The powertrain includes an electric drive module having an electric motor that drives an output, a transmission that is driven by the output of the electric motor, and a clutch that moves between (i) a closed position that transfers torque from the transmission to the driveline; (ii) an open position that decouples torque from the transmission to the driveline; and (iii) a plurality of slip positions between the closed and open positions that partially transfer torque from the transmission to the driveline. The method includes: commanding, at a controller, a steady state clutch operation and electric motor torque based on a position of the accelerator pedal; determining, at the controller, whether an output torque of the electric motor is at a limit; and commanding, at the controller, a simulated shift that modifies a position of the clutch based on a determination that the electric motor is at the limit.

In other features, the method includes commanding, at the controller, a simulated shift that modifies the electric motor torque based on a determination that the electric motor is not at the limit.

According to other features, the method includes determining, at the controller, whether the simulated shift is complete; and commanding, at the controller, steady state clutch operation based on a determination that the simulated shift is complete.

In other features, commanding a simulated shift that modifies a position of the clutch comprises: commanding, at the controller, the clutch to move to a slip position between the open and closed positions for a predetermined time; and commanding, at the controller, the clutch to move to the closed position.

According to additional al features, the method includes commanding, at the controller, the clutch to move to the slip position comprises dropping a clutch torque below a holding torque thereby splitting motor torque between propelling the electrified vehicle and accelerating the electric motor.

In additional features, the method includes commanding, at the controller, the clutch torque to a larger value than the holding torque of the clutch. While the clutch is slipping this results in additional propulsion for the vehicle beyond the torque from the motor.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As discussed above, electrified vehicles typically do not need the same number of gears as in a conventional internal combustion engine (ICE). In this regard, electric motors do not have the same number of gears in their transmissions to accelerate and/or operate efficiently compared to a conventional ICE. However, in some instances, users of electrified vehicles still want to feel the traditional shift disturbance in vehicle acceleration experienced with traditional ICE vehicles. For some vehicles a "sporty" shift feel is desired which typically includes an initial drop in vehicle acceleration, followed by an increase in acceleration, concluding with a return to the prior acceleration. Often times in a conventional gas vehicle there is a drop in acceleration in each gear as gas engines are typically not constant in power when they shift. The acceleration disturbance, found on traditional ICE vehicles, can be seen as a desired attribute to the vehicle and is difficult to always consistently replicate on an electrified vehicle.

The instant disclosure provides an electrified powertrain that controls a friction clutch to provide a simulated speed phase "sporty" shift feel during a simulated shift. The simulated shift can occur even at operating conditions where limits of the actuator (engine, motor and/or battery) are already reached.

Figure 1:
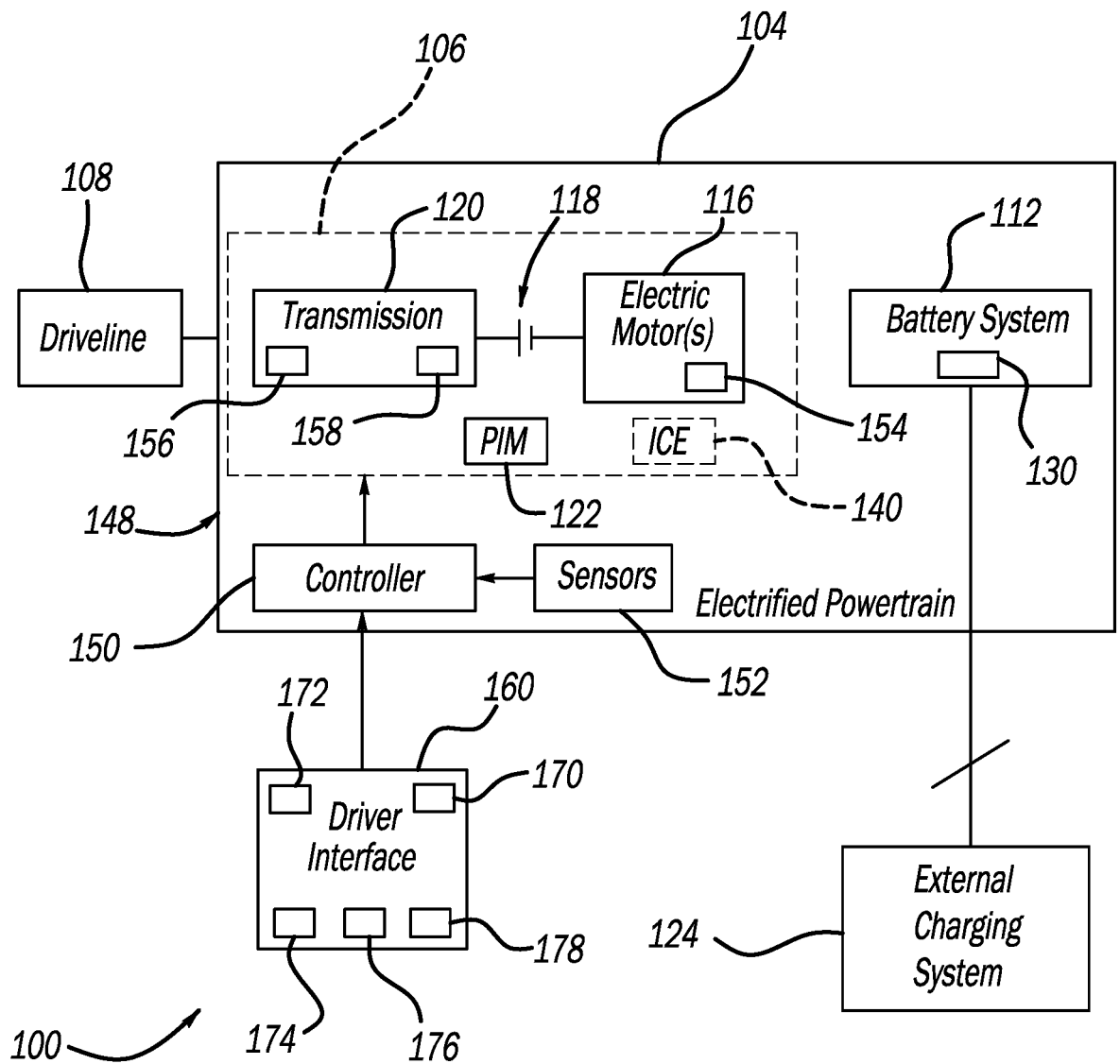
FIG. 1 is a functional block diagram of an electrified vehicle having a control system that simulates a traditional shifting event according to various principles of the present application.

Referring now to FIG. 1, a functional block diagram of an example electrified vehicle 100 (also referred to herein as "vehicle 100") according to the principles of the present application is illustrated. The vehicle 100 includes an electrified powertrain 104 having an electric drive module (EDM) 106 configured to generate and transfer drive torque to a driveline 108 for vehicle propulsion. The EDM 106 generally includes one or more electric drive units or motor (s) 116 (e.g., electric traction motors), a clutch 118, an electric drive gearbox assembly or transmission 120, and power electronics including a power inverter module (PIM) 122. The clutch 118 can be a friction clutch. While the clutch 118 is shown generally between the transmission 120 and the electric motor 116, the clutch 118 can be disposed within the transmission 120 or elsewhere in the electrified powertrain 104 intermediate a power source (electric motor) and the driveline 108.

The electric motor 116 is selectively connectable via the PIM 124 to a high voltage battery system 112 for powering the electric motor 116. The battery system 112 is selectively connectable (e.g., by the driver) to an external charging system 124 (also referred to herein as "charger 124") for charging of the battery system 112. The battery system 112 includes at least one battery pack assembly 130. In some examples, described herein, the electrified powertrain 104 can by a hybrid powertrain that additionally includes an internal combustion engine 140. A control system 148 for implementing a simulated shift according to the present disclosure includes a controller 150 that provides various inputs to the EDM 106 based on inputs from sensors 152 and vehicle operating conditions. The inputs can be related to selectively switching power inputs between the electric motors 116 and the ICE 140. As will be described herein, the controller 150 can also provide commands to the clutch 118 for simulating a shifting event.

The electric motor 116 includes a speed sensor 154. The transmission 120 includes various transmission speed sensors, such as input and output transmission shaft speed sensors 156 and various shift sensors 158, to provide a signal to an associated control system indicative of a transmission gear selected.

The electrified vehicle 100 further includes a driver interface 160. The driver interface 160 includes a steering wheel 170 and a brake pedal 172. The driver interface 160 includes a driver input device, e.g., an accelerator pedal 174, for providing a driver input, e.g., a torque request, for the motor 116. The driver interface 170 can further include a park brake 176. The driver interface 160 or vehicle interior also includes a transmission shift request device, such as a shift lever or rotary shifter 178, for the driver to request a desired gear of the transmission 120. The shift lever or rotary shifter 178 can provide conventional transmission options including park, reverse, neutral, drive and low.

As described herein, the instant disclosure provides a control system that simulates traditional gear shifting on an electrified vehicle. Mimicking a conventional vehicle's shifting is possible by making an electrified vehicle have similar acceleration disturbances at the same vehicle speeds and pedal positions of a conventional vehicle. However, as the electric drive module 106 does not need the same number of gears in the transmission 120 to accelerate and operate efficiently compared to a conventional ICE vehicle. Additional shift disturbances are commanded in the electrified powertrain to simulate shifting events.

Figure 2:
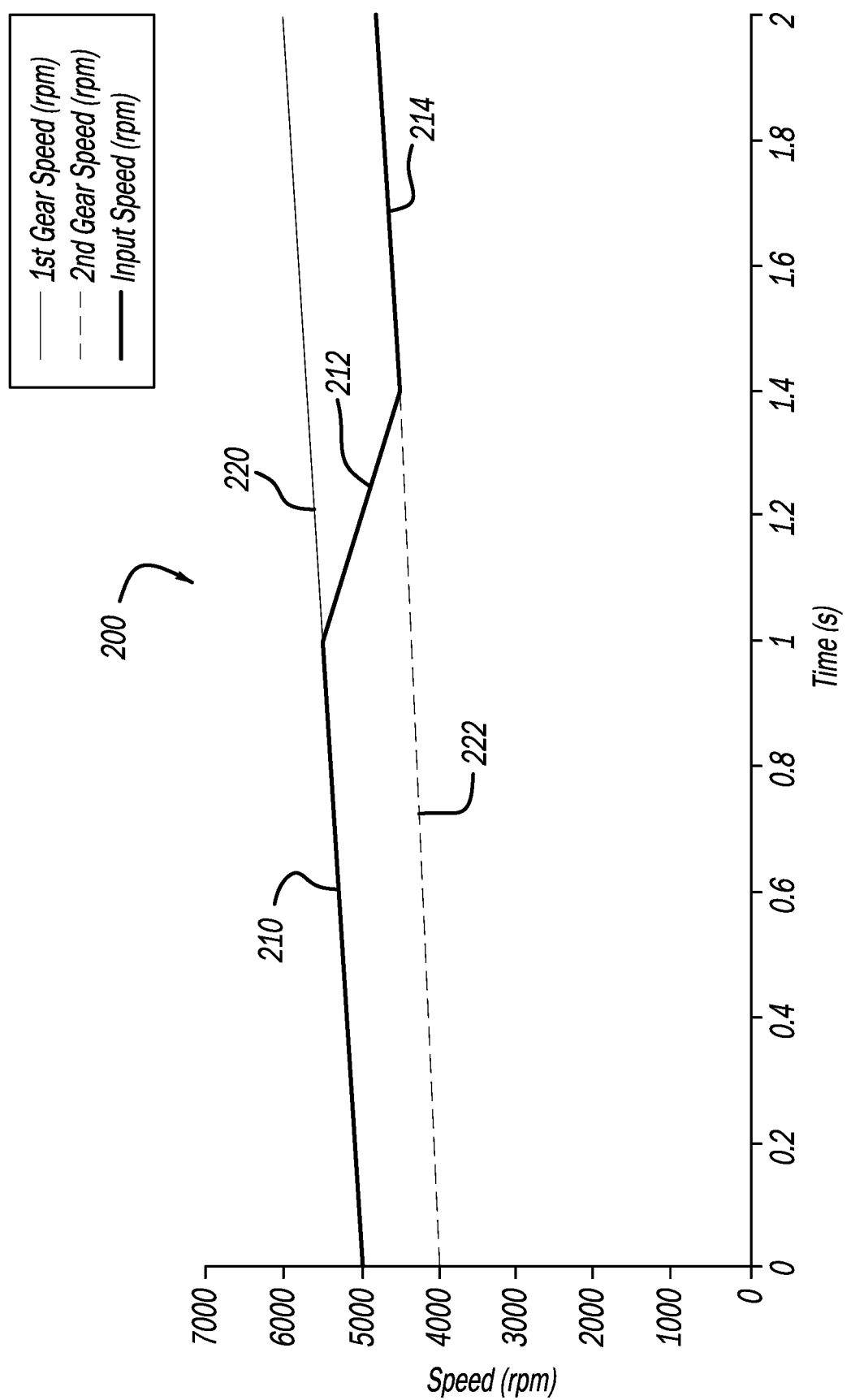
FIG. 2 is a plot illustrating a first gear speed, a second gear speed and an input speed over time for an example shift according to various principles of the present application.

With reference now to FIG. 2, a plot 200 illustrating a first gear speed 220, a second gear speed 222 and an input speed 212 over time is shown. The first gear speed 220 generally follows a path 210 to 220. Similarly, the second gear speed 222 generally follows a path 222 to 214. When a shifting event occurs from the first gear to the second gear, the speed path transitions generally from 210 to 212 and finally through 214. This transition represents a traditional ICE vehicle sporty shift feel.

Figure 3:
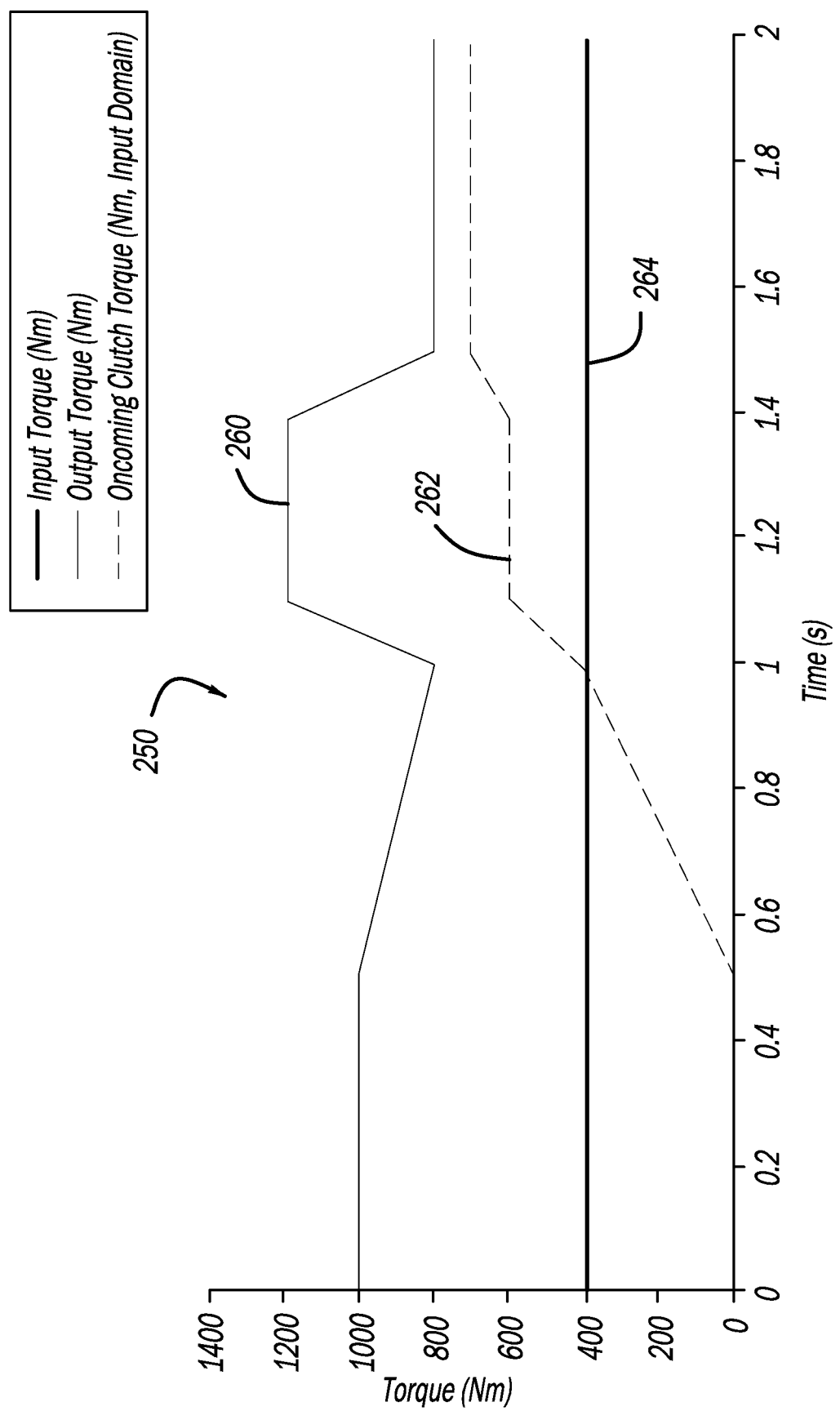
FIG. 3 is a plot illustrating input torque, output torque and oncoming cutch torque over time for an example shift according to various principles of the present application.

With reference now to FIG. 3, a plot 250 illustrating input torque 264, output torque 260 and oncoming cutch torque 262 over time. In general, the torque after the transmission (output torque 260) drops as the torque phase of the shift occurs, followed by a brief increase in output torque during the speed phase due to the transmission input inertia changing speeds (see also FIG. 5 described herein).

For a simulated shift, it is desirable to mimic this shift feel, just without physically shifting between two different gears. In this regard, it is desirable that there is a drop in acceleration, then a push in acceleration, similar to the drop in torque phase, then a push in the speed phase of a conventional "sport" shift. At maximum acceleration, the motor 116 and battery system 112 would be torque or power limited meaning the electrified vehicle 100 cannot reach a higher torque value by using just the motor 116 during the simulated shift (at maximum position of the accelerator pedal 174).

When the motor 116 and/or battery system 112 are at their limits of providing torque and/or power, it has not been considered possible to increase vehicle acceleration to provide this acceleration disturbance. However, by using the friction clutch 118 it is possible to provide the expected shift feel even at maximum motor power by allowing the clutch 118 to slip, then forcing the clutch 118 to zero slip. The control system and method described herein provides this clutch-based shift feel. With the clutch 118 the traditional pull/push feel of a shifting event can be mimicked by allowing the clutch 118 to slip, then forcing the clutch 118 to zero slip. Initially, the clutch torque is dropped below the holding torque, splitting the motor torque between propelling the vehicle and accelerating the motor 116. The provides the sensation of the torque phase of the shift event. Then the clutch torque is controlled to a larger value than the holding torque of the clutch 118 for this input motor torque, providing more propulsive torque to the vehicle than the motor torque alone. As used herein, a holding torque is defined as the exact amount of torque needed to keep a locked clutch 118 from slipping. This is the motor torque multiplied by gear ratios between the motor and this point of the driveline with some simplifying assumptions. This gives a speed phase push feel for "sporty" shifting with only a single clutch even if the motor 116 were otherwise out of torque/power.

Figure 4:
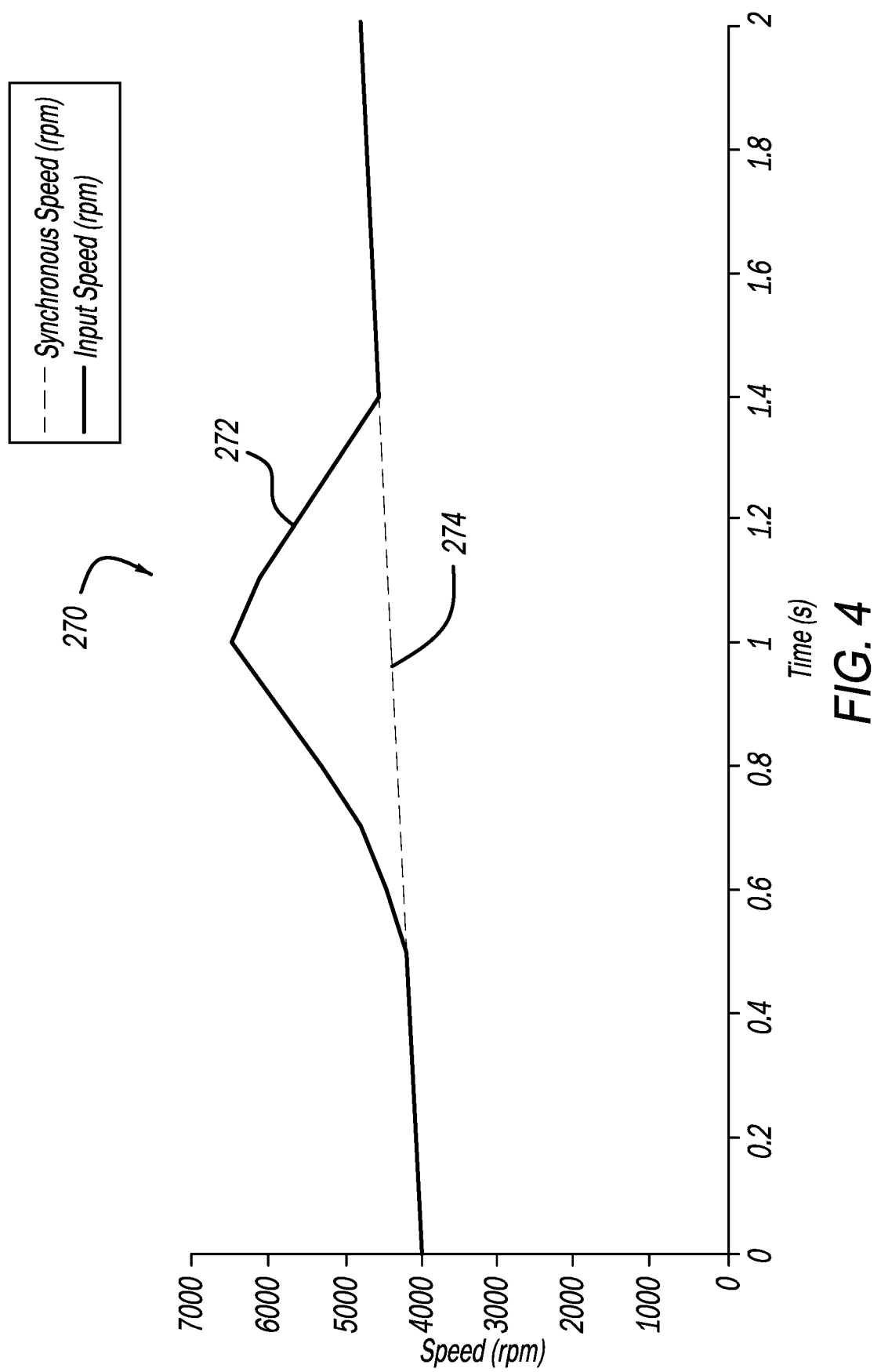
FIG. 4 is a plot illustrating input speed and synchronous speed for an exemplary simulated sporty shift according to various principles of the present application.
Figure 5:
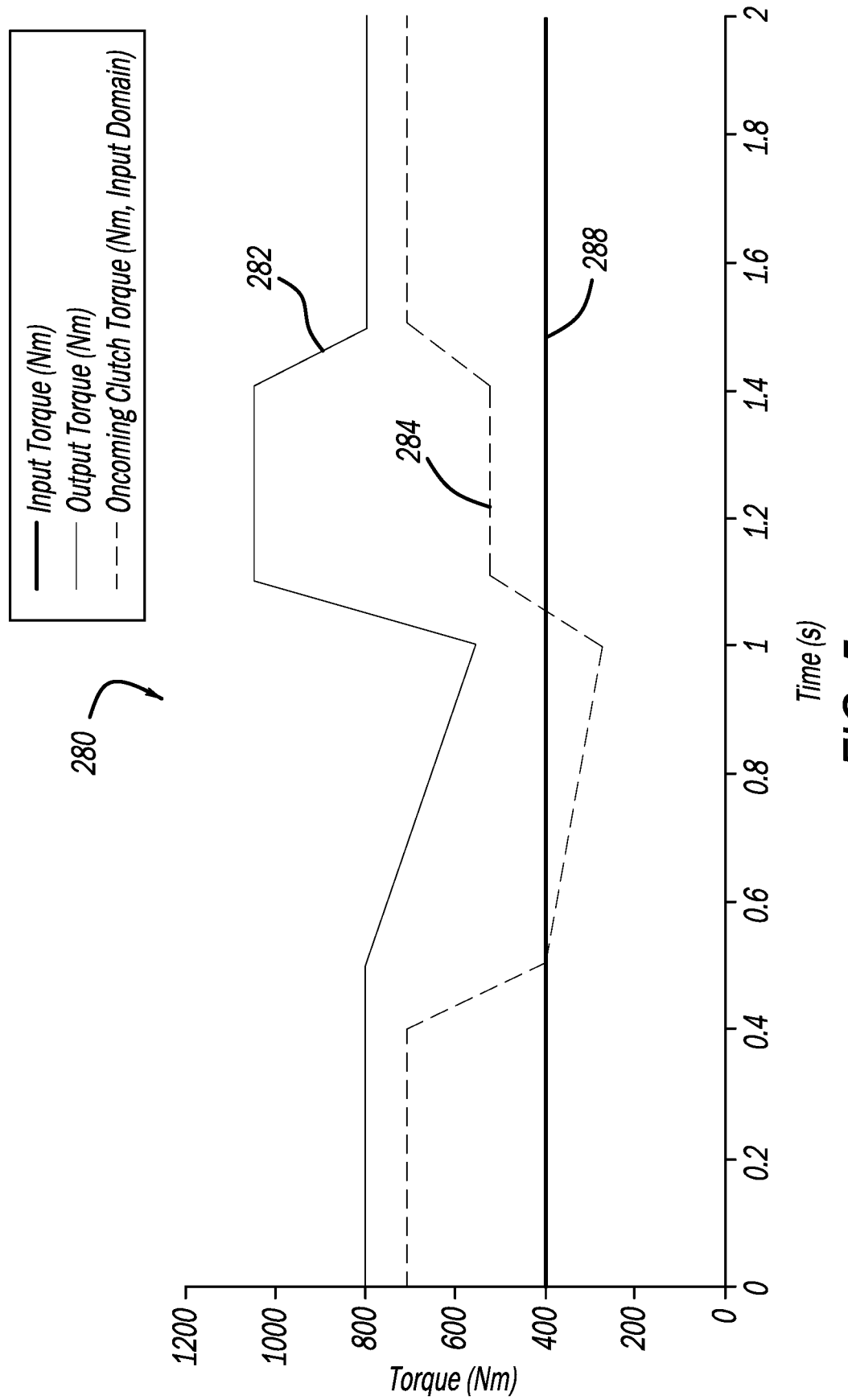
FIG. 5 is a plot illustrating input torque, output torque and oncoming cutch torque for a simulated shift over time according to various principles of the present application.

FIG. 4 is a plot 270 illustrating input speed and synchronous speed for an exemplary sporty shift according to various principles of the present application. An input speed 272 has an elevated speed during a shift compared to a synchronous speed 274. FIG. 5 is a plot 280 illustrating input torque 288, output torque 282 and cutch torque 284 over time according to various principles of the present application.

Traditionally, as a friction clutch is disengaged and the electric motor enters an acceleration phase, an inherent challenge arises with respect to battery power utilization. The control system of the present disclosure achieves a synchronized drop in torque through a coordinated interaction between the clutch 118 and the input torque of the motor 116. By orchestrating these two variables in tandem, a harmonized reduction in power consumption can be achieved. Consequently, the power diversion permits the allocation of the power of the battery system 112 to the motor 116 in a steady state. This method not only facilitates superior control over the decline in acceleration but also capitalizes on the speed phase push that characterizes "sporty" shifts.

Figure 6:
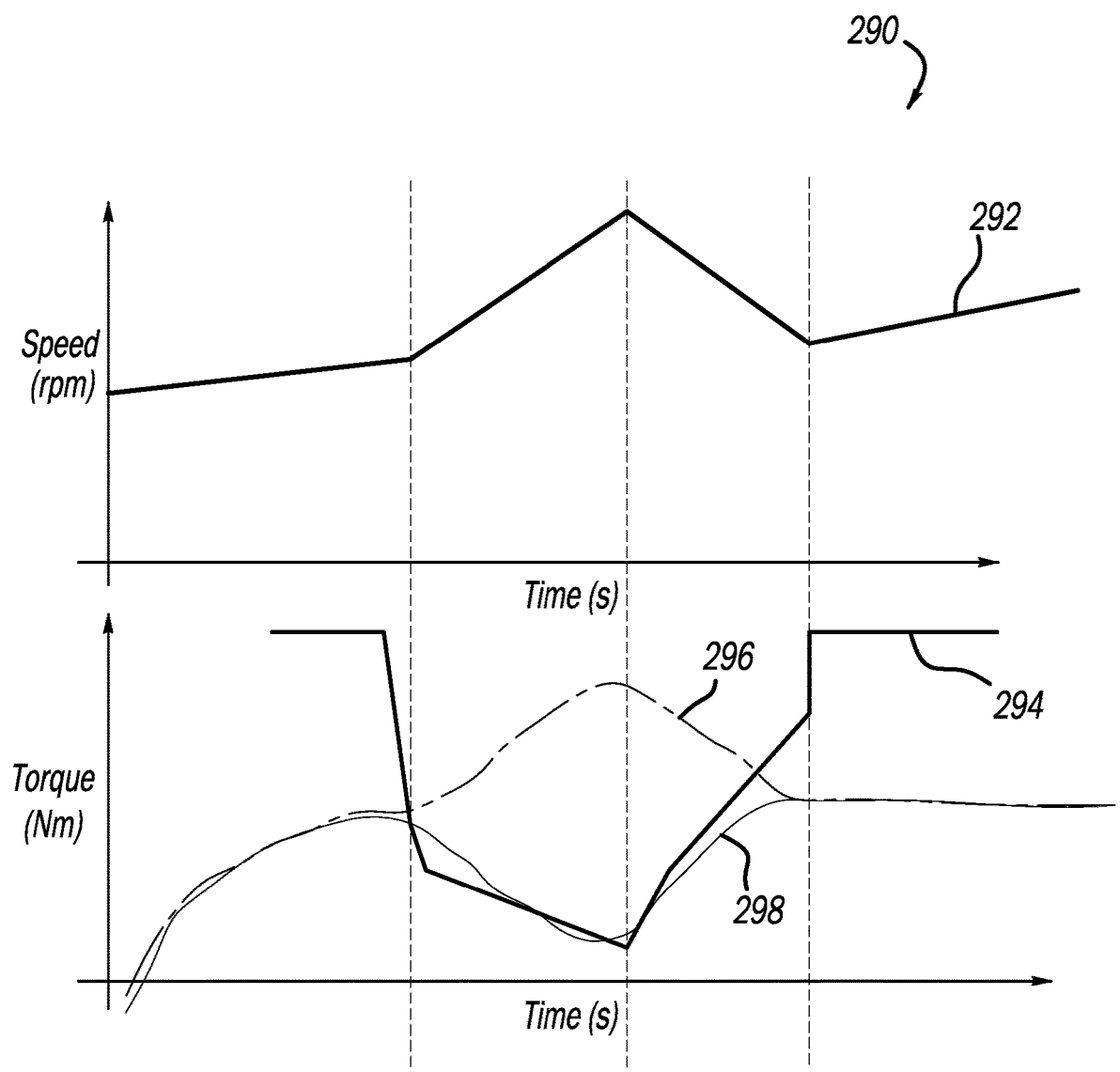
FIG. 6 is a plot illustrating a relationship between motor speed, clutch torque, motor torque input to the transmission and motor torque fixed ratio for a simulated shift illustrating power tradeoff when there are multiple electric motors according to various principles of the present application.

FIG. 6 is a plot 290 illustrating a relationship between motor speed 292, clutch torque 294, motor torque input to the transmission 296 and motor torque fixed ratio 298 according to various principles of the present application. FIG. 6 represents an example of how the instant disclosure can work for a system with two electric motors, one before the clutch 118 and one after the clutch 118. During the phase of acceleration, the torque of the motor 116 can experience a marginal decrease, maintaining just enough positive torque to facilitate its self-acceleration. This strategic calibration prevents unnecessary power waste due to excessive clutch torque and loss, ensuring a judicious use of power of the battery system 112. In the subsequent "push" phase, as the clutch 118 reengages, a subtle elevation in clutch torque is warranted, marginally surpassing the torque of the motor 116. Simultaneously, the torque of the motor 116 can resume higher values as its speed recedes. This interplay of torque allows for a controlled extension of the "push" phase, enabling precise temporal management vehicle meticulously regulating the overall power dynamics of the system. The methods described herein not only mitigates battery drain during simulated shifts but also guarantees an enhanced and engaged driving experience. By modulating power distribution and torque profiles, the control system 148 can deliver a shift feel that mirrors the sensations of traditional gear shifts, yet optimally tailored to the electric vehicle's unique characteristics.

Figure 7:
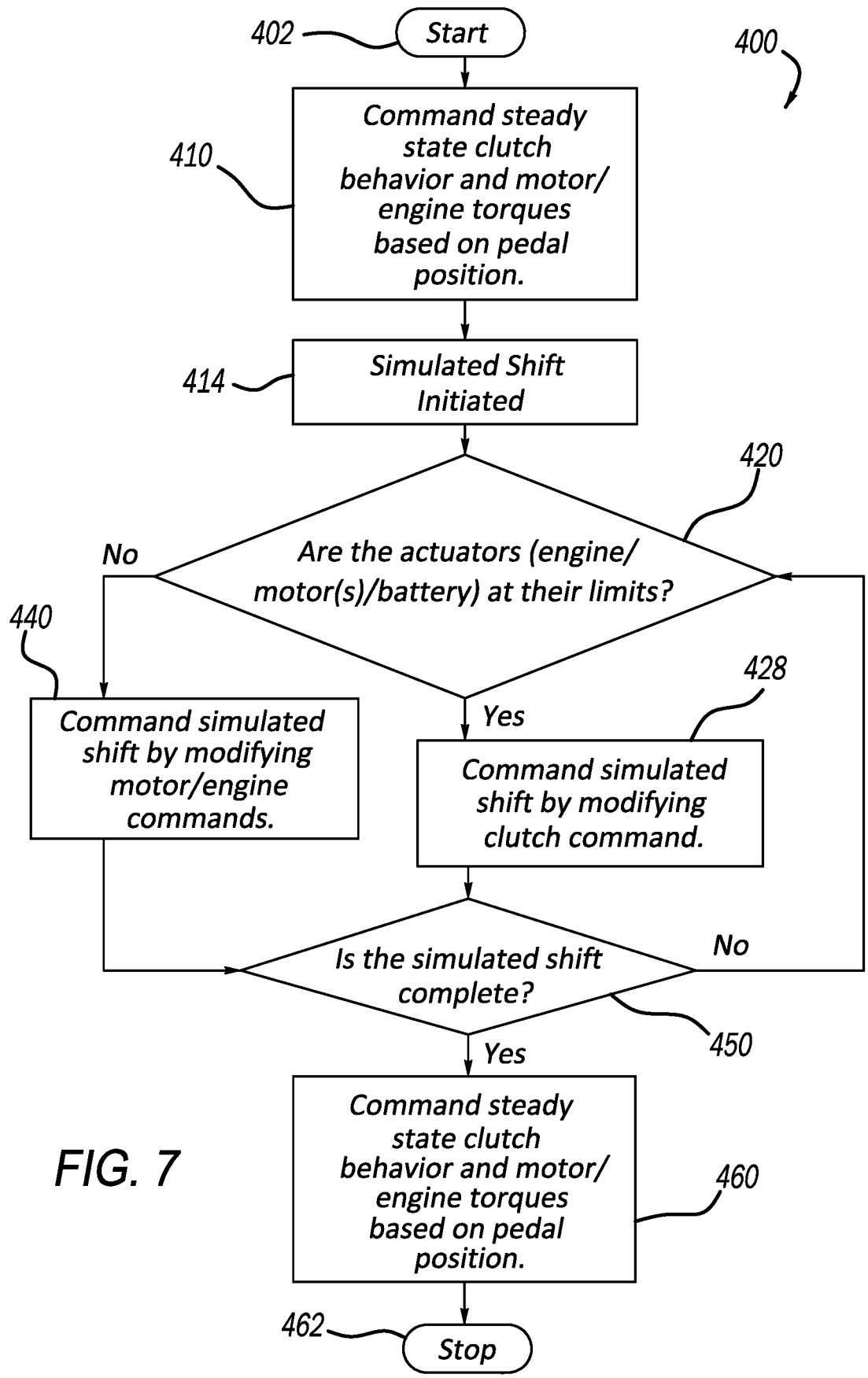
FIG. 7 is a flow chart illustrating an exemplary method of implementing the control system of the present disclosure.

With additional reference now to FIG. 7, a method of implementing the control system to provide a simulated shift on the electrified vehicle 100 will be described. The method starts at 402. At 410 control commands steady state clutch behavior and motor torque based on the position of the accelerator pedal 174. At 414 a simulated shift is initiated. At 420 control determines whether the actuators (motor 116, battery system 112, and optionally the ICE 140) are at their limits. If control determines that the actuators are not at their limits, control commands simulated shift by modifying the motor 116 (and in some examples the ICE 140) torque at 440. If control determines that the actuators are at their limits, control commands a simulated shift by modifying clutch commands at 428. Modifying clutch commands includes commanding the clutch 118 to move between open and closed positions as necessary. At 450 control determines whether the simulated shift is complete. At 460 control commands steady state behavior of the clutch 118 and torque of the motor 116 (and in some examples, torque of the ICE 140) based on the position of the accelerator pedal 174. Control ends at 462.

As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. An electrified powertrain that generates and transfers drive torque to a driveline of an electrified vehicle, the electrified powertrain comprising:
   an electric drive module comprising:
      an electric motor having an output;
      a transmission that is driven by the output of the electric motor; and
      a clutch that moves between (i) a closed position that transfers torque from the transmission to the driveline; (ii) an open position that decouples torque from the transmission to the driveline; and (iii) a plurality of slip positions between the closed and open positions that partially transfer torque from the transmission to the driveline;
   a controller that controls operation of the clutch based on operating conditions including a position of an accelerator pedal, wherein the controller is configured to:
      command a steady state clutch operation and electric motor torque based on a position of the accelerator pedal;
      determine whether an output torque of the electric motor is at a limit; and
      command a simulated shift that modifies a position of the clutch based on a determination that the electric motor is at the limit.

2. The electrified powertrain of claim 1, wherein the controller is further configured to:
   command a simulated shift that modifies the electric motor torque based on a determination that the electric motor is not at the limit.

3. The electrified powertrain of claim 2, wherein the controller is further configured to:
   determine whether the simulated shift is complete; and
   command steady state clutch operation based on a determination that the simulated shift is complete.

4. The electrified powertrain of claim 2, wherein commanding a simulated shift that modifies a position of the clutch comprises:
   commanding the clutch to move to a slip position between the open and closed positions for a predetermined time; and
   commanding the clutch to move to the closed position.

5. The electrified powertrain of claim 4, commanding the clutch to move to the slip position comprises dropping a clutch torque below a holding torque thereby splitting motor torque between propelling the electrified vehicle and accelerating the electric motor.

6. The electrified powertrain of claim 5, wherein the controller is further configured to:
   command the clutch torque to a larger value than the holding torque of the clutch while the clutch is slipping resulting in additional propulsion for the vehicle beyond torque from the electric motor.

7. The electrified powertrain of claim 1, further comprising:
   an internal combustion engine (ICE) that selectively drives the driveline.

8. A method for controlling an electrified powertrain that generates and transfers drive torque to a driveline of an electrified vehicle, the powertrain including an electric drive module having an electric motor that drives an output, a transmission that is driven by the output of the electric motor, and a clutch that moves between (i) a closed position that transfers torque from the transmission to the driveline; (ii) an open position that decouples torque from the transmission to the driveline; and (iii) a plurality of slip positions between the closed and open positions that partially transfer torque from the transmission to the driveline, the method comprising:
   commanding, at a controller, a steady state clutch operation and electric motor torque based on a position of the accelerator pedal;
   determining, at the controller, whether an output torque of the electric motor is at a limit; and
   commanding, at the controller, a simulated shift that modifies a position of the clutch based on a determination that the electric motor is at the limit.

9. The method of claim 8, further comprising:
   commanding, at the controller, a simulated shift that modifies the electric motor torque based on a determination that the electric motor is not at the limit.

10. The method of claim 9, further comprising:
    determining, at the controller, whether the simulated shift is complete; and
    commanding, at the controller, steady state clutch operation based on a determination that the simulated shift is complete.

11. The method of claim 9 wherein commanding a simulated shift that modifies a position of the clutch comprises:
    commanding, at the controller, the clutch to move to a slip position between the open and closed positions for a predetermined time; and
    commanding, at the controller, the clutch to move to the closed position.

12. The method of claim 11, further comprising:
    commanding, at the controller, the clutch to move to the slip position comprises dropping a clutch torque below a holding torque thereby splitting motor torque between propelling the electrified vehicle and accelerating the electric motor.

13. The method of claim 12, further comprising:
    commanding the clutch torque to a larger value than the holding torque of the clutch while the clutch is slipping resulting in additional propulsion for the vehicle beyond torque from the electric motor.

* * * * *